United States Patent
Iwane (10) Patent No.: US 9,001,249 B2
(45) Date of Patent: Apr. 7, 2015

(54) SOLID-STATE IMAGE SENSOR AND CAMERA

(75) Inventor: Masaaki Iwane, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 13/480,762

(22) Filed: May 25, 2012

(65) Prior Publication Data

US 2012/0307100 A1 Dec. 6, 2012

(30) Foreign Application Priority Data

Jun. 6, 2011 (JP) ................................ 2011-126705

(51) Int. Cl.
- H04N 5/335 (2011.01)
- H04N 5/228 (2006.01)
- H04N 5/378 (2011.01)

(52) U.S. Cl.
CPC .............. *H04N 5/378* (2013.01); *H04N 5/335* (2013.01)

(58) Field of Classification Search
USPC .................................... 348/222.1; 250/208.1
See application file for complete search history.

(56) References Cited

U.S. PATENT DOCUMENTS

| | | | |
|---|---|---|---|
| 5,451,909 A * | 9/1995 | Fattaruso | 330/311 |
| 7,935,995 B2 | 5/2011 | Watanabe et al. | 257/292 |
| 8,111,311 B2 | 2/2012 | Iwane | 348/294 |
| 8,139,133 B2 | 3/2012 | Iwane et al. | 348/308 |
| 2006/0011807 A1* | 1/2006 | Lee et al. | 250/208.1 |
| 2007/0008009 A1* | 1/2007 | Son et al. | 326/87 |
| 2008/0012976 A1 | 1/2008 | Sakurai et al. | |
| 2009/0267585 A1* | 10/2009 | Liu et al. | 323/313 |
| 2010/0149394 A1 | 6/2010 | Yamazaki et al. | 348/308 |
| 2010/0194946 A1 | 8/2010 | Shinohara et al. | 348/300 |

FOREIGN PATENT DOCUMENTS

JP 2003-032548 A 1/2003

* cited by examiner

*Primary Examiner* — Roberto Velez
*Assistant Examiner* — Stephen Coleman
(74) *Attorney, Agent, or Firm* — Fitzpatrick, Cella, Harper & Scinto

(57) ABSTRACT

A solid-state image sensor has a pixel array including pixel units and column signal lines. Each pixel unit includes a photoelectric converter and an amplifier transistor which outputs a signal to the column signal line. The sensor includes a cascode current source which supplies a current to the amplifier transistor and which includes cascode-connected first and second transistors, a first bias circuit which determines a voltage of a first node connected to a gate of the first transistor, and a second bias circuit which determines a voltage of a second node connected to a gate of the second transistor.

16 Claims, 7 Drawing Sheets

SOLID-STATE IMAGE SENSOR AND CAMERA

BACKGROUND OF THE INVENTION

1. Field of the Invention

The present invention relates to a solid-state image sensor and a camera in which the solid-state image sensor is mounted.

2. Description of the Related Art

A CMOS solid-state image sensor includes a pixel array in which a plurality of pixel units is arranged two-dimensionally. The pixel array includes a plurality of column signal lines. In the CMOS solid-state image sensor, each pixel unit includes at least one photoelectric converter, and an amplifier transistor which outputs, to a column signal line, a signal corresponding to charges accumulated in the photoelectric converter. When the pixel unit includes a plurality of photoelectric converters, the photoelectric converters can share one amplifier transistor. The CMOS solid-state image sensor further includes a current source which defines the magnitude of a current flowing through the column signal line. The current source and the amplifier transistor of the pixel unit form a source follower circuit. The source follower circuit outputs a signal from the pixel to the column signal line.

In the solid-state image sensor, as the number of pixels increases, the number of column signal lines in the pixel array and the number of current sources connected to them also increase. This increases power consumption.

SUMMARY OF THE INVENTION

The present invention provides a technique advantageous for reducing power consumption.

One of the aspects of the present invention provides a solid-state image sensor including a pixel array in which a plurality of pixel units are arranged two-dimensionally, the pixel array including a plurality of column signal lines, and each pixel unit including at least one photoelectric converter and an amplifier transistor which outputs, to the column signal line, a signal corresponding to charges generated in the photoelectric converter, the solid-state image sensor comprising: a cascode current source which supplies a current to the amplifier transistor, the cascode current source including a first transistor and second transistor which are cascode-connected; a first bias circuit which determines a voltage of a first node connected to a gate of the first transistor; and a second bias circuit which determines a voltage of a second node connected to a gate of the second transistor, wherein the amplifier transistor and the cascode current source form a source follower circuit, the first bias circuit determines the voltage of the first node to set a current driving capability of the first transistor when the cascode current source is in an active state, to be equal to a current driving capability of the first transistor when the cascode current source is in an inactive state, and the second bias circuit determines the voltage of the second node to set a current driving capability of the second transistor when the cascode current source is in the inactive state, to be smaller than a current driving capability of the second transistor when the cascode current source is in the active state.

Further features of the present invention will become apparent from the following description of exemplary embodiments with reference to the attached drawings.

DESCRIPTION OF THE EMBODIMENTS

Figure 1:
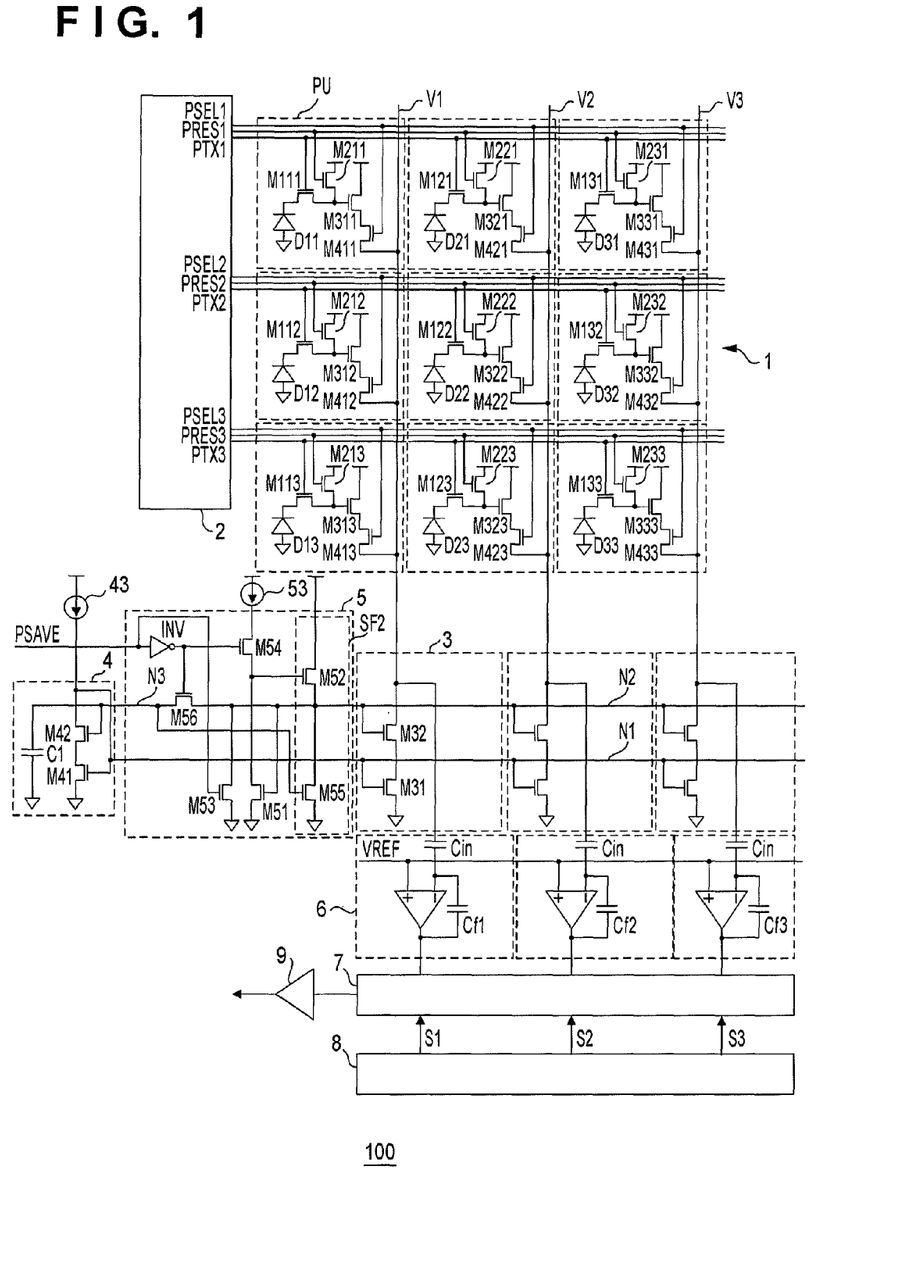
FIG. 1 is a circuit diagram showing the arrangement of a solid-state image sensor according to the first embodiment of the present invention.

A solid-state image sensor 100 according to the first embodiment of the present invention will be described with reference to FIG. 1. The solid-state image sensor 100 includes a pixel array 1 in which a plurality of pixel units PU are arranged two-dimensionally. The pixel array 1 includes a plurality of column signal lines V, that is, column signal lines V1 to V3 in FIG. 1. Each pixel unit PU includes at least one photoelectric converter D, that is, one of photoelectric converters D11 to D33 in FIG. 1, and an amplifier transistor M3, that is, one of amplifier transistors M311 to M333 in FIG. 1 configured to output a signal corresponding to charges generated in the photoelectric converter D to the column signal line V. In FIG. 1, each pixel unit PU includes only one photoelectric converter D. When each pixel unit PU includes a plurality of photoelectric converters D, the photoelectric converters D can share one amplifier transistor M3. One pixel includes one photoelectric converter D. When one pixel unit PU includes a plurality of photoelectric converters D, one pixel unit PU includes a plurality of pixels.

Each pixel unit PU can include a transfer transistor M1, that is, one of transfer transistors M111 to M133 in FIG. 1 configured to transfer, to a node (this node is called a floating diffusion or charge-voltage converter) connected to the gate of the amplifier transistor M3, charges which are generated and accumulated upon photoelectric conversion by the photoelectric converter D. A vertical scanning circuit 2 controls the charge transfer operation of the transfer transistor M1. More specifically, when transfer signals PTX, that is, transfer signals PTX1 to PTX3 in FIG. 1 change to an active level, the transfer transistors M1 transfer charges to the gates of the amplifier transistors M3.

Each pixel unit PU can also include a reset transistor M2, that is, one of reset transistors M211 to M233 in FIG. 1 configured to reset the gate voltage of the amplifier transistor M3 to a predetermined voltage. The vertical scanning circuit 2 controls the reset operation of the reset transistor M2. More specifically, when reset signals PRES, that is, reset signals PRES1 to PRES3 in FIG. 1 change to an active level, the reset transistors M2 reset the gate voltages of the amplifier transistors M3.

Each pixel unit PU can include a selection transistor M4, that is, one of selection transistors M411 to M433 in FIG. 1 configured to select the pixel unit PU including pixels on a readout target row. The vertical scanning circuit 2 controls the selection transistor M4 of the pixel unit PU including a readout target row. More specifically, when selection signals PSEL, that is, selection signals PSEL1 to PSEL3 in FIG. 1 change to an active level, the selection transistors M4 of the corresponding pixel units PU are turned on, and the amplifier transistors M3 of the corresponding pixel units PU drive the column signal lines V. The pixel unit PU can also be selected by the gate voltage of the amplifier transistor M3 that is reset by the reset transistor M2. In this case, the selection transistor M4 can be omitted. More specifically, the voltage of the gate of the amplifier transistor M3 is reset to a voltage at which the amplifier transistor M3 is turned on, thereby selecting the pixel unit PU containing the amplifier transistor M3. Also, the voltage of the gate of the amplifier transistor M3 is reset to a voltage at which the amplifier transistor M3 is turned off, thereby canceling selection of the pixel unit PU containing the amplifier transistor M3.

The solid-state image sensor 100 further includes, for each column signal line V, a cascode current source 3 which defines the magnitude of a current flowing through the column signal line V, and a readout circuit (column amplifier) 6 which reads out a signal output from the pixel unit PU to the column signal line V. Each cascode current source 3 supplies a current to the amplifier transistor M3 of the pixel unit PU connected to the corresponding column signal line V. Each cascode current source 3 includes a first transistor M31 and second transistor M32 which are cascode-connected. The first transistor M31 and second transistor M32 can operate in a saturated region when the cascode current source 3 is active. In terms of the relationship with the readout circuit 6 on a subsequence stage, the first transistor M31 and second transistor M32 can operate in a saturated region in a readout state in which the readout circuit 6 operates. The active state of the cascode current source 3 is a state in which the cascode current source 3 supplies a current to the amplifier transistor M3 of the pixel unit PU so that the amplifier transistor M3 operates in a saturated region. The inactive state of the cascode current source 3 is a state in which the cascode current source 3 supplies a current smaller than one in the active state to the amplifier transistor M3. The inactive state of the cascode current source 3 is more preferably a state in which the magnitude of a current supplied from the cascode current source 3 to the amplifier transistor M3 is 0. In the following description, the "active state" means that the cascode current source 3 is active. The "inactive state" means that the cascode current source 3 is inactive. The cascode current source 3 is advantageous because the magnitude of a current supplied from it hardly varies. The amplifier transistor M3 of the pixel unit PU and the cascode current source 3 corresponding to it form a source follower circuit for outputting a signal corresponding to the voltage of the floating diffusion to the column signal line V.

The solid-state image sensor 100 further includes a first bias circuit 4 which determines the voltage of a first node N1 connected to the gates of the first transistors M31, and a second bias circuit 5 which determines the voltage of a second node N2 connected to the gates of the second transistors M32. The first bias circuit 4 determines the gate voltage of the first node N1 so that the current driving capability of the first transistor M31 in the active state and that of the first transistor M31 in the inactive state become equal to each other. In other words, the first bias circuit 4 can set the voltage of the first node N1 at the same magnitude in both the active and inactive states. The current driving capability is the magnitude of a current which can flow through the source-drain path of a transistor. The current driving capability depends on the gate voltage of the transistor.

The second bias circuit 5 determines the voltage of the second node N2 so that the current driving capability of the second transistor M32 in the inactive state becomes smaller than that of the second transistor M32 in the active state. In an example shown in FIG. 1, the voltage of the node N2 in the inactive state is set to a voltage (ground voltage) at which the second transistor M32 is turned off. However, this is merely an example of control to set the current driving capability of the second transistor M32 in the inactive state to be smaller than that of the second transistor M32 in the active state. For example, the voltage of the node N2 may be set so that the second transistor M32 operates in a linear region in the inactive state. In the embodiment, when the cascode current source 3 is active, the readout circuit 6 also operates and changes to the readout state. When the cascode current source 3 is active, a power save signal PSAVE supplied from a controller (not shown) becomes inactive (low level in this case). To the contrary, when the cascode current source 3 is inactive, the readout circuit 6 also becomes inactive, and the power save signal PSAVE becomes active (high level in this case).

According to the first embodiment, the current driving capability of the second transistor M32 in the inactive state is set smaller than that of the second transistor M32 in the active state. A current flowing through the column signal line V (cascode current source 3) in the inactive state can become smaller than a current flowing through the column signal line V in the active state. This can reduce power consumption in the inactive state.

The solid-state image sensor 100 includes a first current source 43 interposed between the power supply line (first voltage line) and the ground line (second voltage line). The first bias circuit 4 can include a third transistor M41 interposed between the first current source 43 and the ground line (second voltage line), and a fourth transistor M42 interposed between the first current source 43 and the drain of the third transistor M41. The gate of the third transistor M41 and the first node N1 can be connected to a node between the first current source 43 and the fourth transistor M42. The gate of the fourth transistor M42 can receive a voltage at which the fourth transistor M42 is turned on. The first bias circuit 4 can include a holding capacitor C1 which holds a voltage to be applied to a third node N3 connected to the gate of the fourth transistor M42. The second bias circuit 5 can include a fifth transistor M56 which charges the holding capacitor C1 by connecting the second node N2 and third node N3 in the active state, and disconnects the second node N2 and third node N3 in the inactive state.

The second bias circuit 5 can include a second source follower circuit SF2 which sets the voltage of the second node N2 in the active state. The second source follower circuit SF2 can include, as a load circuit, a transistor M55 to which the voltage of the second node N2 is applied at the gate via the fifth transistor M56 in the active state. In the active state, the fifth transistor M55 functions as a diode-connected transistor. The second bias circuit 5 can also include a transistor M53 as a circuit which sets the voltage of the second node N2 so that the current driving capability of the second transistor M32 in the inactive state becomes smaller than that of the second transistor M32 in the active state.

The solid-state image sensor 100 also includes a line memory 7, horizontal scanning circuit 8, and output amplifier 9. The line memory 7 holds a signal read out by the readout circuit 6. The horizontal scanning circuit 8 generates column selection signals S, that is, column selection signals S1 to S3 in FIG. 1 for selecting a column. The output amplifier 9 sequentially outputs signals held in the line memory 7 in accordance with column selection by the output amplifier 9.

Figure 2:
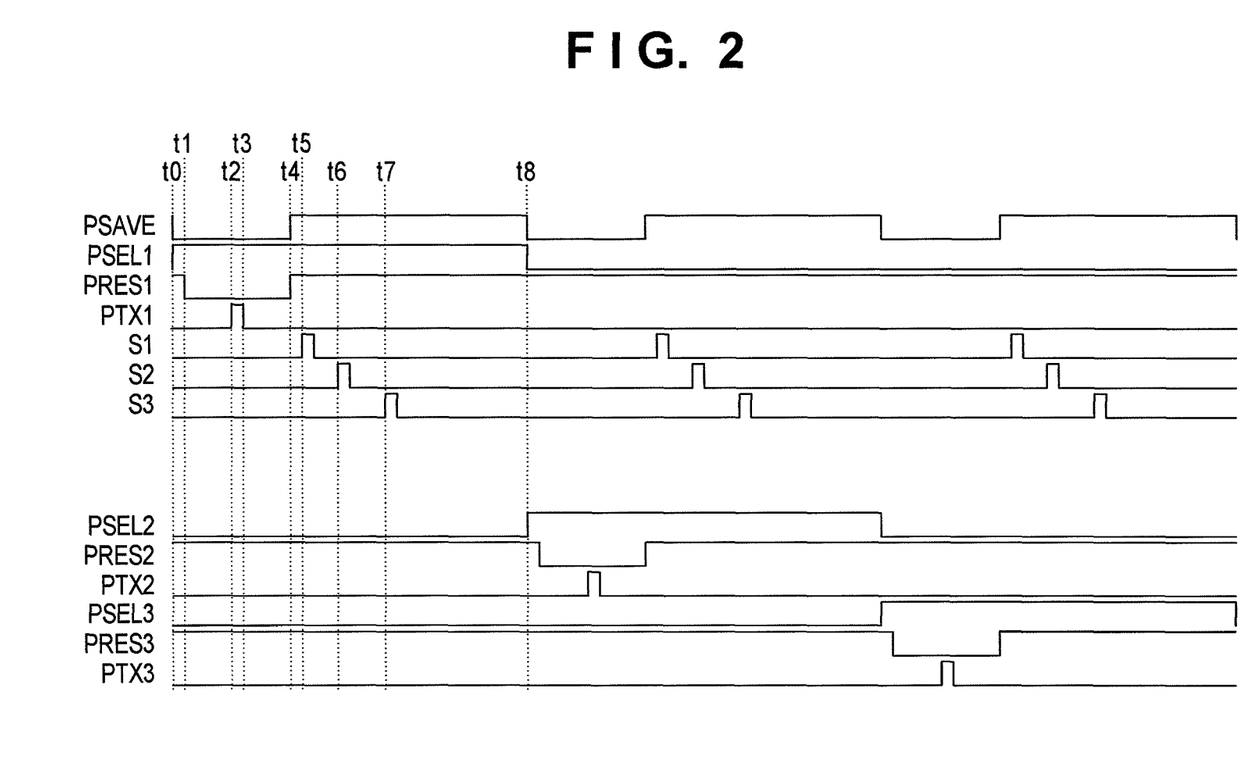
FIG. 2 is a timing chart showing the operation of the solid-state image sensor according to the first embodiment of the present invention.

The detailed operation of the solid-state image sensor 100 shown in FIG. 1 will be exemplified with reference to FIG. 2. At time t0, the vertical scanning circuit 2 drives the selection signal PSEL1 from low level to high level to turn on (electrically connect) the selection transistors M411, M421, and M431, selecting pixel units PU including pixels on the first row of the pixel array 1. At this time, the power save signal PSAVE switches from high level (inactive state) to low level (active state). In response to this, the NMOS transistor M53 changes from the ON state (conductive state) to the OFF state (non-conductive state). An NMOS transistor M54 and the NMOS transistor M56 change from the OFF state to the ON state.

This raises the drain voltage of a source-common NMOS transistor M51 through which a current from a second current source 53 flows. At this time, the gate voltage of the NMOS transistor M51 (voltage of the second node N2) is lower than the gate voltage of the NMOS transistor M54 interposed between the second current source 53 and the NMOS transistor M51. Hence, the drain voltage of the NMOS transistor M51 rises abruptly. As a result, the gate voltage of an NMOS transistor M52 which forms the second source follower circuit SF2 also rises abruptly. The NMOS transistor M52 supplies a large current to the second node N2 using the diode-connected NMOS transistor M55 as a load. This abruptly raises the potential of the second node N2.

Since the voltage of the second node N2 has risen, the gate voltage of the NMOS transistor M51 rises and the drain voltage of the NMOS transistor M51 drops. A current flowing from the NMOS transistor M52 decreases. Accordingly, the voltage of the second node N2 settles at a given voltage by negative feedback. By this operation, the cascode current source 3 can quickly return from the inactive state to the active state. At this time, if the voltage of the second node N2 excessively rises, the drain voltage of the NMOS transistor M51 drops. Negative feedback acts in a direction in which the source voltage of the NMOS transistor M52, that is, the voltage of the second node N2 drops.

In the first bias circuit 4, when the fifth transistor M56 is turned on in the active state, the gate voltage of the fourth transistor M42, that is, the voltage of the third node N3 is set to the voltage of the second node N2 in the active state. The holding capacitor C1 holds the voltage of the third node N3. The gate of the third transistor (NMOS transistor) M41 is connected to the source of the fourth transistor (NMOS transistor) M42 series-connected to the third transistor M41. The voltage of the first node N1 is therefore determined by the voltage of the first node N1 in the active state and the characteristics of the third transistor M41 and fourth transistor M42.

Before time t0, the power save signal is at high level and is inactive. Even in the inactive state, the gate voltage of the fourth transistor M42 is held at the voltage of the second node N2 in the active state, as described above. Thus, even the voltage of the first node N1 is maintained at a voltage in the active state. When the state shifts to the active state at time t0, the cascode current source 3 can quickly return to the active state. To reduce noise in the cascode current source 3, the areas of the gate electrodes of the third transistor M41 and first transistor M31 are preferably increased. This is effective in increasing the parasitic capacitance of the first node N1 and maintaining the voltage of the first node N1 in the inactive state to be equal to that of the first node N1 in the active state.

At time t1, the vertical scanning circuit 2 drives the reset signal PRES1 from high level to low level to turn on the reset transistors M211, M221, and M231. Then, nodes connected to the gates of the amplifier transistors M311, M321, and M331, that is, the floating diffusions float, and reset signals N can be read out. In this state, the voltages of the floating diffusions, that is, the reset signals N that are amplified by the source follower circuits formed from the amplifier transistors M311, M321, and M331 and the cascode current sources 3 are output to the column signal lines V1, V2, and V3. The reset signals N are written in input capacitors Cin of amplifier circuits which form the readout circuits 6. After that, the reset operation ends.

At time t2, the vertical scanning circuit 2 drives the transfer signal PTX1 from low level to high level to turn on the transfer transistors M111, M121, and M131. Then, charges (electrons) accumulated in the photoelectric converters D11, D21, and D31 are transferred to the floating diffusions, changing (decreasing) the voltages of the floating diffusions. The voltages of the floating diffusions, that is, optical signals S that are amplified by the source follower circuits formed from the amplifier transistors M311, M321, and M331 and the cascode current sources 3 are output to the column signal lines V1, V2, and V3. Signals each obtained by subtracting the reset signal N from the optical signal S are written in feedback capacitors Cf1, Cf2, and Cf3 of the amplifier circuits which form the readout circuits. At time t3, the vertical scanning circuit 2 drives the transfer signal PTX1 from high level to low level to end transfer of charges from the photoelectric converters D11, D21, and D31 to the floating diffusions.

At time t4, the operation of writing signals each obtained by subtracting the reset signal N from the optical signal S, that is, signals (S−N) having undergone correlated double sampling (CDS) in the feedback capacitors Cf1, Cf2, and Cf3 of the column amplifiers 6 ends. The signals (S−N) are output from the readout circuits 6 and written in the line memory 7. At time t4, the write operation in the line memory 7 ends. The power save signal PSAVE is driven from low level to high level, and the cascode current source 3 changes to a current driving capability in the inactive state. Since the power save signal PSAVE has changed to high level, the NMOS transistor M53 is turned on, and the NMOS transistors M54 and M56 are turned off. In response to this, the voltage of the second node N2 drops to the ground voltage, the second transistors M32 of the cascode current sources 3 are turned off, and the cascode current sources 3 become inactive. Since the power save signal PSAVE is at high level, the NMOS transistor M56 is OFF. The holding capacitor C1 holds the gate voltage of the fourth transistor M42 of the first bias circuit 4 at the voltage of the second node N2 in the active state. Accordingly, the cascode current sources 3 can quickly return from the current driving capability in the inactive state to the active state.

At time t5, the horizontal scanning circuit 8 drives the column selection signal S1 to high level for a predetermined time. The signal (S−N) of the first column that has been written in the line memory 7 is horizontally transferred, and output from the solid-state image sensor 100 via the output amplifier 9. Similarly, at time t6, the horizontal scanning circuit 8 drives the column selection signal S2 to high level for a predetermined time. The signal (S−N) of the second column that has been written in the line memory 7 is horizontally transferred, and output from the solid-state image sensor 100 via the output amplifier 9. At time t7, the horizontal scanning circuit 8 drives the column selection signal S3 to high level for a predetermined time. The signal (S−N) of the third column that has been written in the line memory 7 is horizontally transferred, and output from the solid-state image sensor 100 via the output amplifier 9. This operation is repeated until the signal of the final column that has been written in the line memory 7 is output.

At time t8, the vertical scanning circuit 2 drives the selection signal PSEL2 from low level to high level to turn on (electrically connect) the selection transistors M412, M422, and M432, selecting pixel units PU (pixels in FIG. 1) on the second row of the pixel array 1. A subsequent operation for the second row and an operation for the third and subsequent rows are the same as that for the first row.

As described above, according to the first embodiment, the current driving capability of the cascode current source 3 in the inactive state is set smaller than that of the cascode current source 3 in the active state. A current flowing through the column signal line V (cascode current source 3) in the inactive state can become smaller than a current flowing through the column signal line V in the active state. This can reduce power consumption in the inactive state.

In the first embodiment, to reduce noise in the cascode current source 3, the areas of the gate electrodes of the third transistor M41 and first transistor M31 are preferably increased. In this case, it is advantageous for quick return to the active state to maintain the voltage of the first node N1 in the inactive state to be equal to that of the first node N1 in the active state. Quick return to the active state is beneficial because signals of one frame are quickly read out from the solid-state image sensor 100.

According to the first embodiment, the first node N1 and second node N2 are independent of each other. Potential fluctuations via the parasitic capacitance of the second bias circuit 5 or the like hardly affect the gate voltage of the first transistor M31 which forms the cascode current source 3. This is advantageous because currents flowing through the column signal lines V1, V2, and V3 are kept constant.

Figure 3:
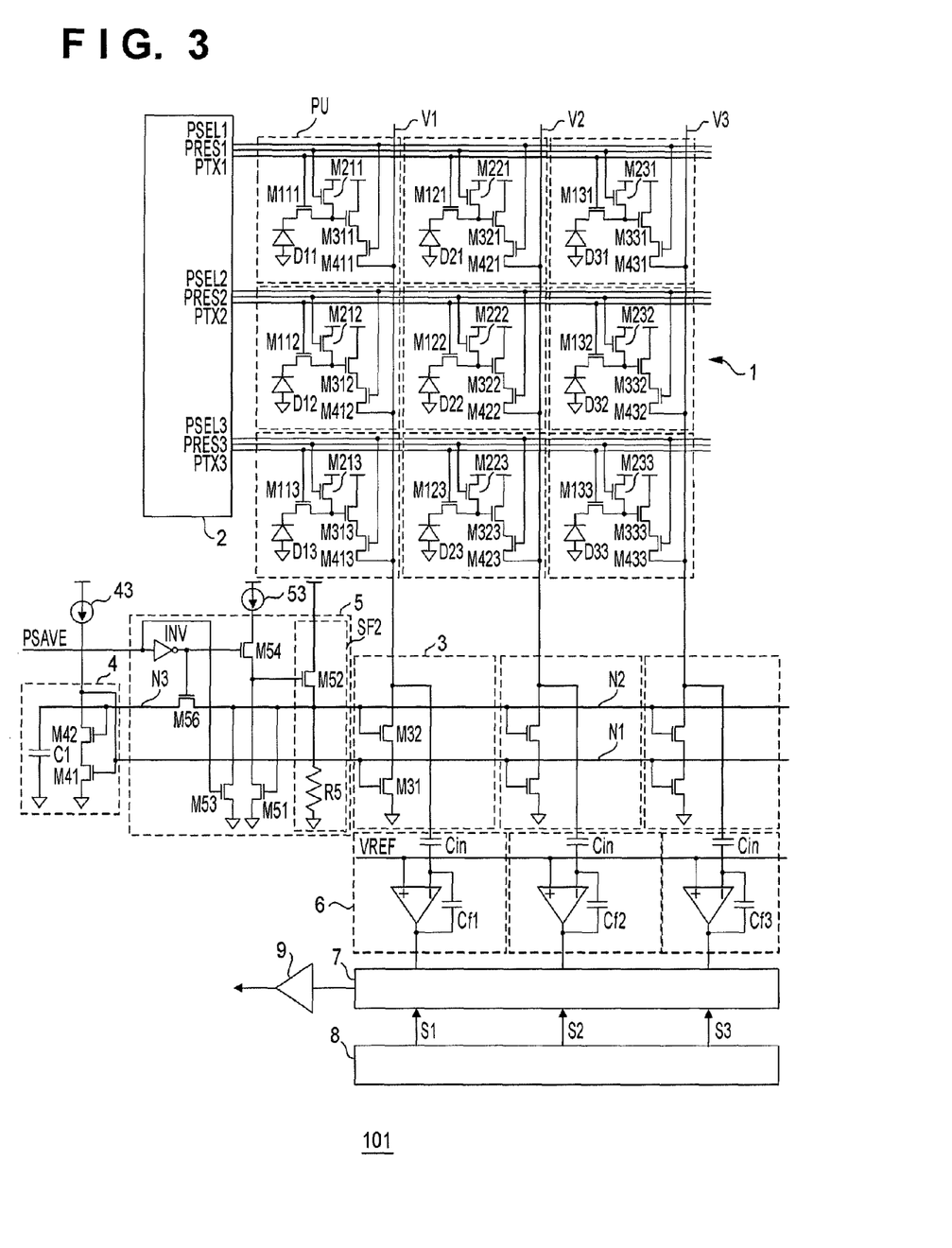
FIG. 3 is a circuit diagram showing the arrangement of a solid-state image sensor according to the second embodiment of the present invention.

A solid-state image sensor 101 according to the second embodiment of the present invention will be described with reference to FIG. 3. Note that matters not mentioned in the second embodiment can comply with those in the first embodiment. In the second embodiment, a resistive element R5 replaces the load circuit (NMOS transistor M55) in the second source follower circuit SF2 in the first embodiment. Even this arrangement has the same effects as those in the first embodiment.

Figure 4:
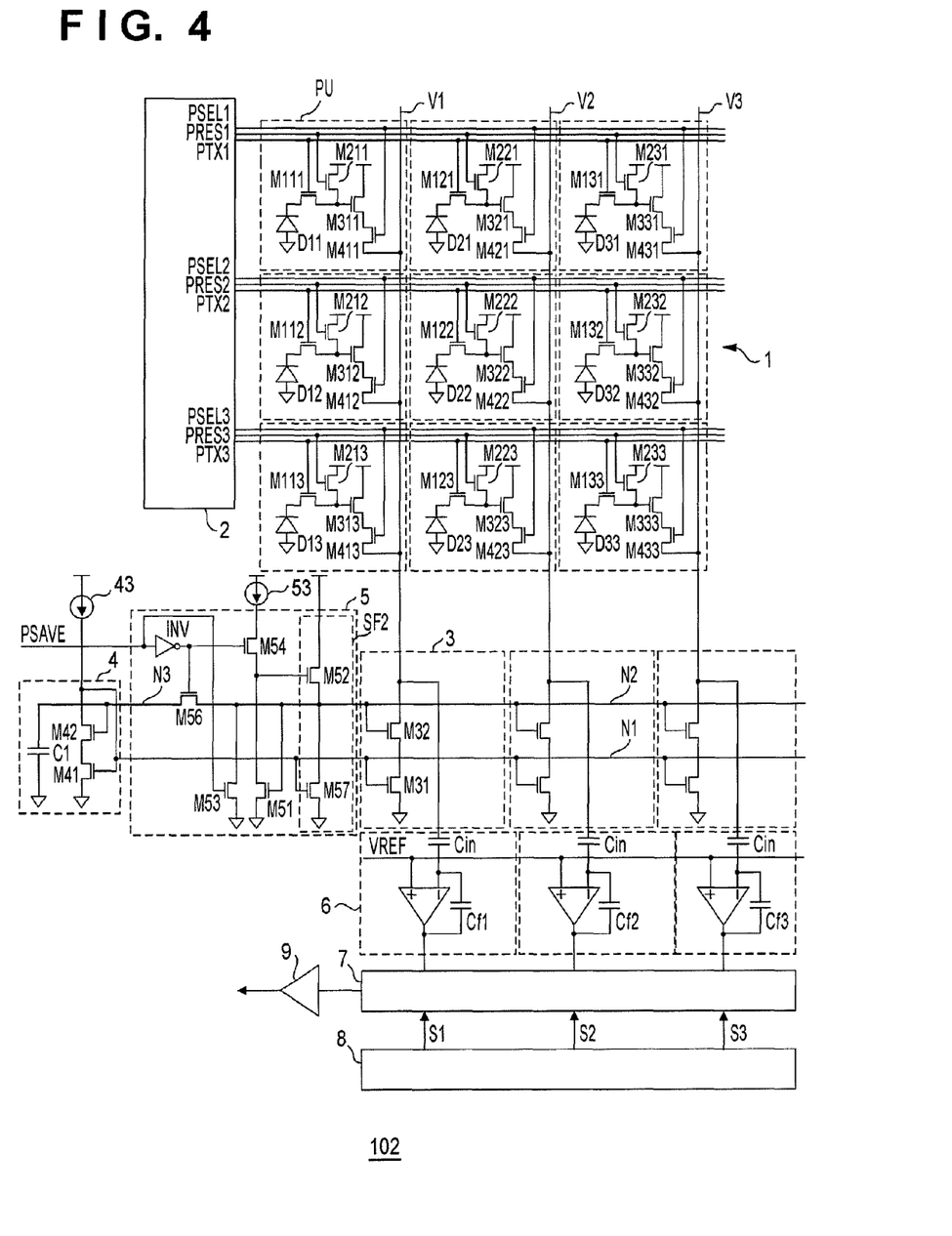
FIG. 4 is a circuit diagram showing the arrangement of a solid-state image sensor according to the third embodiment of the present invention.

A solid-state image sensor 102 according to the third embodiment of the present invention will be described with reference to FIG. 4. Note that matters not mentioned in the third embodiment can comply with those in the first embodiment. In the third embodiment, an NMOS transistor M57 having a gate connected to a first node N1 replaces the load circuit (NMOS transistor M55) in the second source follower circuit SF2 in the first embodiment. Even this arrangement has the same effects as those in the first embodiment. The NMOS transistor M57 functions as a constant current source.

Figure 5:
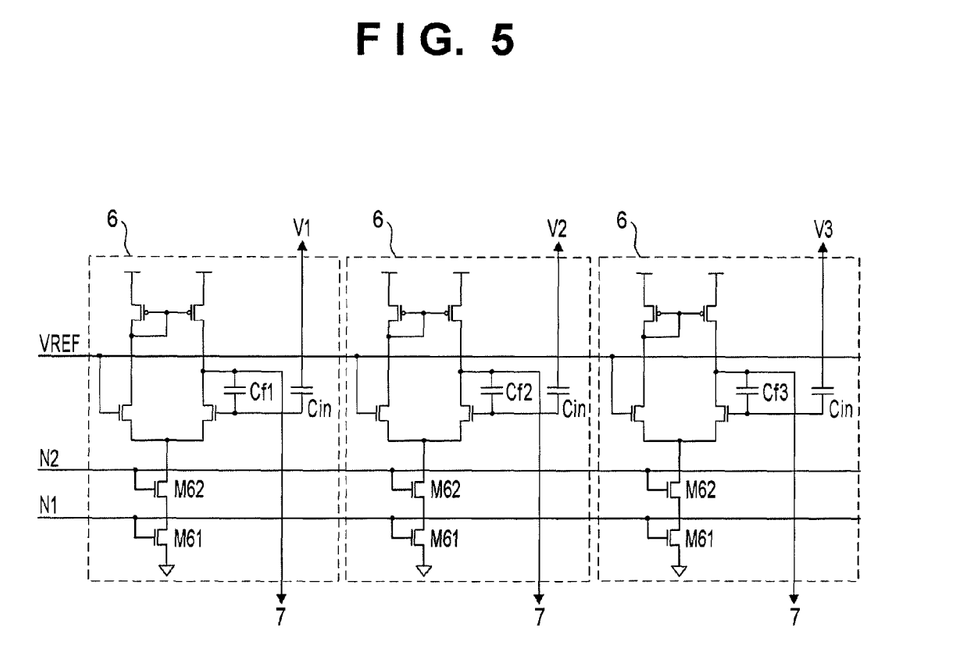
FIG. 5 is a circuit diagram showing the arrangement of a solid-state image sensor according to the fourth embodiment of the present invention.

A solid-state image sensor according to the fourth embodiment of the present invention will be described with reference to FIG. 5. Note that matters not mentioned in the fourth embodiment can comply with those in the first to third embodiments. In the fourth embodiment, the current source of a differential amplifier circuit which forms a readout circuit (column amplifier) 6 is controlled by the voltages of a first node N1 and second node N2 which are driven by a first bias circuit 4 and second bias circuit 5 in the first to third embodiments. Even in the readout circuit 6, the current source is preferably a cascode current source because a constant current hardly varies, and the cascode current source is advantageous for preventing smear and ensuring linearity. For this reason, a cascode current source configured by cascode-connecting NMOS transistors M61 and M62 is used as the current source of the readout circuit 6. The first bias circuit 4 and second bias circuit 5 drive the gates of the NMOS transistors M61 and M62 by the voltages of the first node N1 and second node N2. The fourth embodiment is advantageous because a signal is quickly read out from a pixel array 1 while reducing power consumption in the readout circuit 6.

Figure 6:
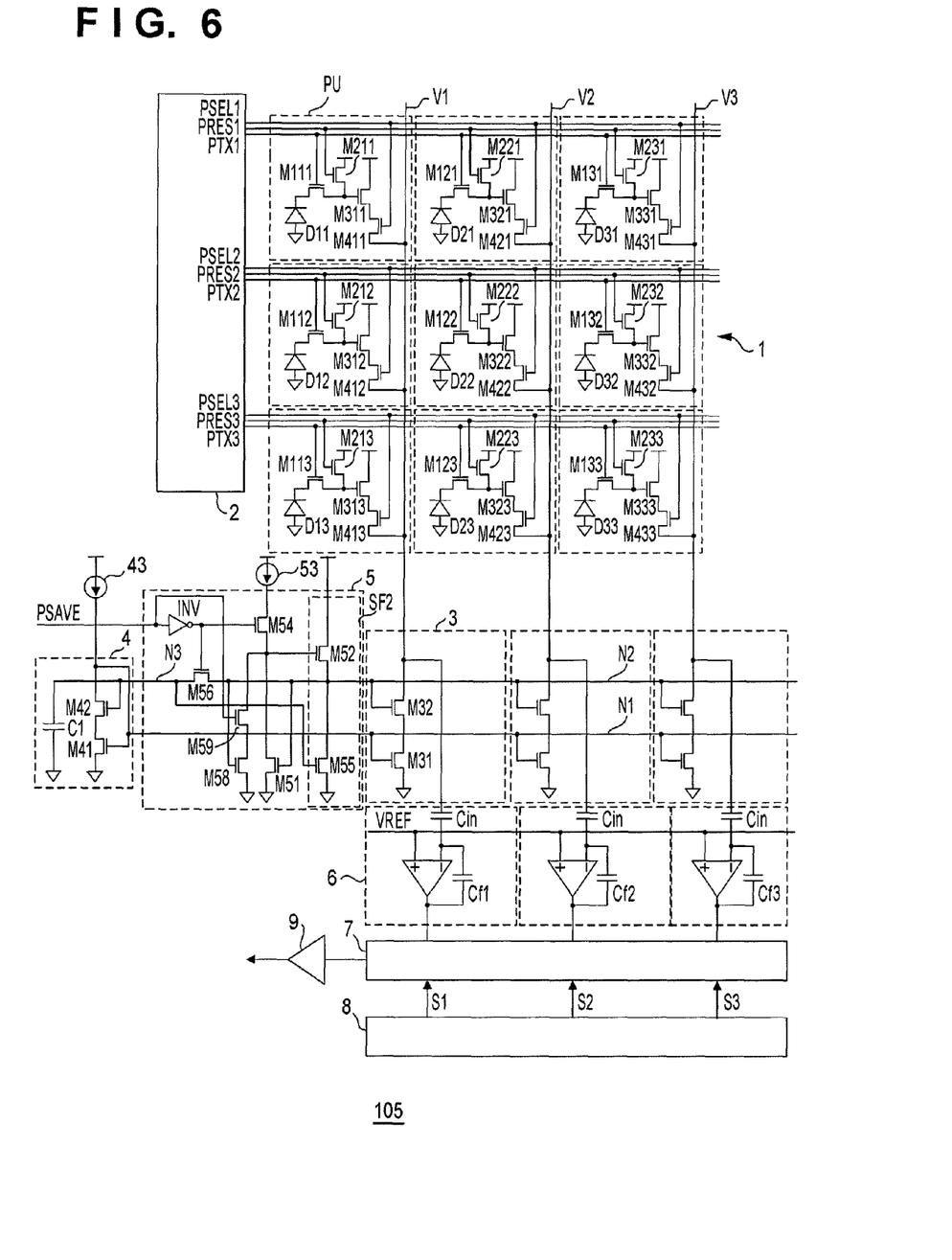
FIG. 6 is a circuit diagram showing the arrangement of a solid-state image sensor according to the fifth embodiment of the present invention.

A solid-state image sensor 105 according to the fifth embodiment of the present invention will be described with reference to FIG. 6. Note that matters not mentioned in the fifth embodiment can comply with those in the first to fourth embodiments. A first bias circuit 4 and second bias circuit 5 in the fifth embodiment may be applied to the fourth embodiment. In the fifth embodiment, the voltage of a second node N2 is determined so that the current driving capability of a second transistor M32 in the inactive state becomes smaller than that of the second transistor M32 in the active state. The second bias circuit 5 does not set the current driving capability of the second transistor M32 to 0 even in the inactive state.

In the inactive state, the power save signal PSAVE changes to high level to turn on an NMOS transistor M59. An NMOS transistor M58 and the NMOS transistor M59 determine the gate voltage of an NMOS transistor M52. The voltage of the second node N2 in the inactive state becomes lower than that of the second node N2 in the active state, but does not become a voltage at which the second transistor M32 of a cascode current source 3 is turned off. The second transistor M32 of the cascode current source 3 therefore defines the magnitudes of currents on column signal lines V1, V2, and V3. That is, the second transistor M32 of the cascode current source 3 operates in a linear region, and currents flowing through the column signal lines V1, V2, and V3 are defined not by the first transistor M31 but by the second transistor M32. For example, currents flowing through the column signal lines V1, V2, and V3 in the inactive state are reduced to ½ or less of currents flowing through the column signal lines V1, V2, and V3 in the active state.

According to the fifth embodiment, the state can more quickly return from the inactive state to the active state.

Figure 7:
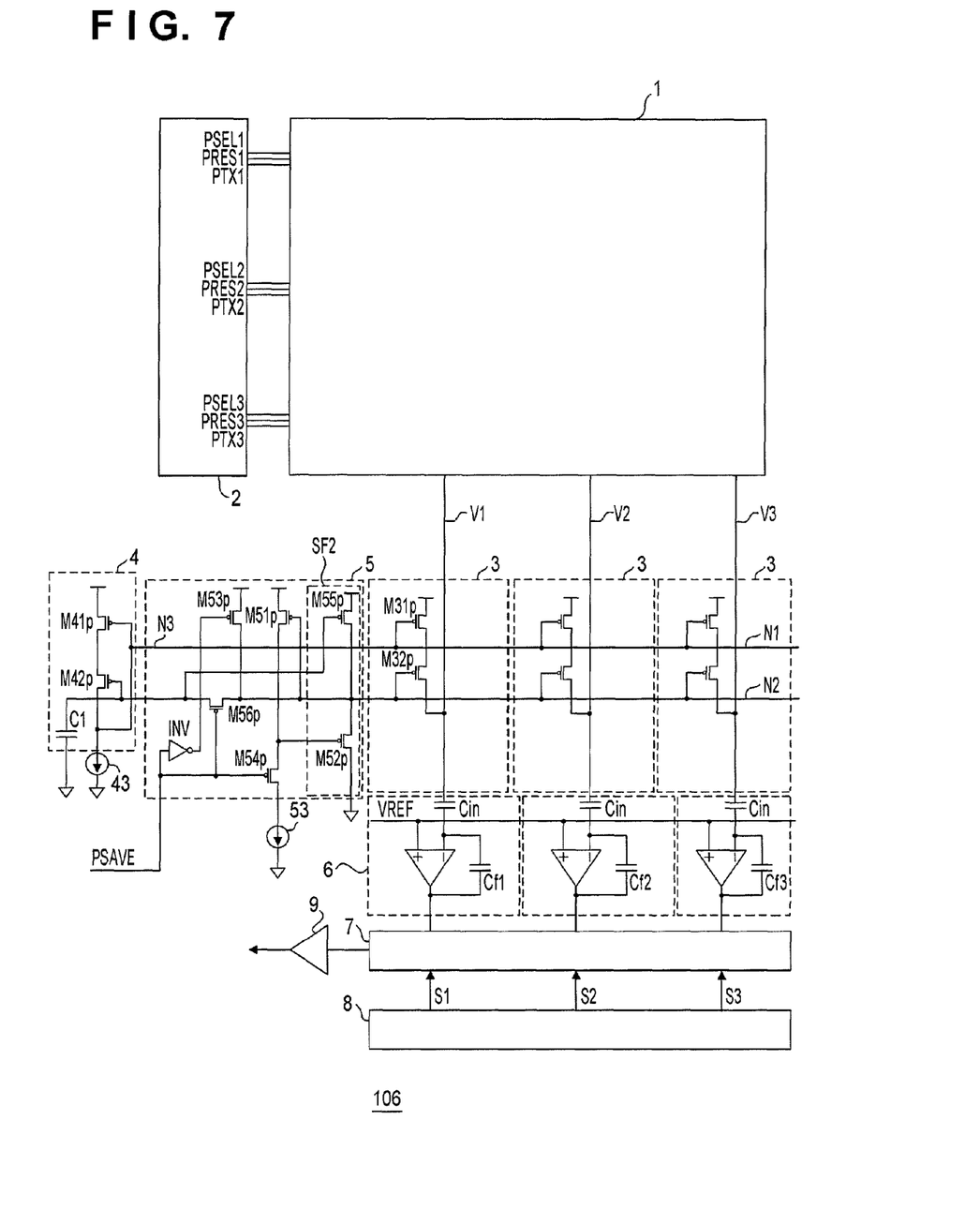
FIG. 7 is a circuit diagram showing the arrangement of a solid-state image sensor according to the sixth embodiment of the present invention.

A solid-state image sensor 106 according to the sixth embodiment of the present invention will be described with reference to FIG. 7. The first embodiment has exemplified an arrangement for accumulating electrons as charges in the photoelectric converter D. In the sixth embodiment, the first embodiment is changed to accumulate holes as charges in a photoelectric converter SD. The remaining arrangement is also changed in accordance with this. In a pixel array 1, a hole accumulation type photoelectric converter replaces the photoelectric converter D in the first embodiment. In the first embodiment, the transistors M1, M2, M3, and M4 are NMOS transistors. In the sixth embodiment, transistors M1, M2, M3, and M4 are PMOS transistors.

Transistors which form a cascode current source 3, first bias circuit 4, and second bias circuit 5 (except for transistors which form CMOS circuits such as an inverter) are also changed from NMOS transistors to PMOS transistors. A suffix "p" is added to a PMOS transistor in the sixth embodiment that corresponds to an NMOS transistor in the first embodiment.

The solid-state image sensor 106 includes a first current source 43 interposed between the ground line (first voltage line) and the power supply line (second voltage line). The first bias circuit 4 can include a third transistor M41p interposed between the first current source 43 and the power supply line (second voltage line), and a fourth transistor M42p interposed between the first current source 43 and the drain of the third transistor M41p. The gate of the third transistor M41p and the first node N1 can be connected to a node between the first current source 43 and the fourth transistor M42p. The gate of the fourth transistor M42p can receive a voltage at which the fourth transistor M42p is turned on. The first bias circuit 4 can include a holding capacitor C1 which holds a voltage to be applied to a third node N3 connected to the gate of the fourth transistor M42p. The second bias circuit 5 can include a fifth transistor M56p which charges the holding capacitor C1 by connecting the second node N2 and third node N3 in the active state, and disconnects the second node N2 and third node N3 in the inactive state.

The second bias circuit 5 can include a second source follower circuit SF2 which sets the voltage of the second node N2 in the active state. The second source follower circuit SF2 can include, as a load circuit, a PMOS transistor M55p to which the voltage of the second node N2 is applied at the gate via the PMOS transistor (fifth transistor) M56p in the active state. In the active state, the PMOS transistor M55p functions as a diode-connected transistor. The second bias circuit 5 can also include a PMOS transistor M53p as a circuit which sets the voltage of the second node N2 so that the current driving capability of a second transistor M32p in the inactive state becomes smaller than that of the second transistor M32p in the active state.

When the power save signal PSAVE switches from high level (inactive state) to low level (active state), the PMOS transistor M53p changes from the ON state to the OFF state. A PMOS transistor M54p and the PMOS transistor M56p change from the OFF state to the ON state. This decreases the drain voltage of a source-common PMOS transistor M51p through which a current to a second current source 53 flows. At this time, the gate voltage of the PMOS transistor M51p (voltage of the second node N2) is higher than the gate voltage of the PMOS transistor M54p interposed between the second current source 53 and the PMOS transistor M51p. Hence, the drain voltage of the PMOS transistor M51p drops abruptly. As a result, the gate voltage of a PMOS transistor M52p which forms the second source follower circuit SF2 also drops abruptly. The PMOS transistor M52p supplies a large current to the second node N2 using the diode-connected PMOS transistor M55p as a load. The potential of the second node N2 then drops abruptly.

Since the voltage of the second node N2 drops, the gate voltage of the PMOS transistor M51p drops and the drain voltage of the PMOS transistor M51p rises. A current flowing from the PMOS transistor M52p decreases. In this way, the voltage of the second node N2 settles at a given voltage by negative feedback. By this operation, the cascode current source 3 can quickly return from the inactive state to the active state.

In the first bias circuit 4, when the PMOS transistor M56p is turned on in the active state, the gate voltage of the fourth transistor M42p, that is, the voltage of the third node N3 is set to the voltage of the second node N2 in the active state. The holding capacitor C1 holds the voltage of the third node N3. The gate of the third transistor (PMOS transistor) M41p is connected to the source of the fourth transistor (PMOS transistor) M42p series-connected to the third transistor M41p. The voltage of the first node N1 is therefore determined by the voltage of the first node N1 in the active state and the characteristics of the third transistor M41p and fourth transistor M42p.

As an application of the solid-state image sensor according to each of the above-described embodiments, a camera in which the solid-state image sensor is assembled will be exemplified. The concept of the camera includes not only an apparatus whose main purpose is shooting, but also an apparatus (for example, a personal computer or portable terminal) accessorily having a shooting function. The camera includes the solid-state image sensor according to the present invention that has been exemplified as each of the above-described embodiments, and a processing unit which processes a signal output from the solid-state image sensor. The processing unit can include, for example, an A/D converter, and a processor which processes digital data output from the A/D converter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-126705, filed Jun. 6, 2011, which is hereby incorporated by reference herein in its entirety.

What is claimed is:

1. A solid-state image sensor including a pixel array in which a plurality of pixel units are arranged two-dimensionally, the pixel array including a plurality of column signal lines, and each pixel unit including at least one photoelectric converter and an amplifier transistor which outputs, to the column signal line, a signal corresponding to charges generated in the photoelectric converter, the solid-state image sensor comprising:

a cascode current source which supplies a current to the amplifier transistor, the cascode current source including a first transistor and second transistor which are cascode-connected;

a first bias circuit which determines a voltage of a first node connected to a gate of the first transistor;

a second bias circuit which determines a voltage of a second node connected to a gate of the second transistor; and a first current source which is interposed between a first voltage line and a second voltage line, wherein the amplifier transistor and the cascode current source form a source follower circuit, the first bias circuit determines the voltage of the first node to set a current driving capability of the first transistor when the cascode current source is in an active state, to be equal to a current driving capability of the first transistor when the cascode current source is in an inactive state, the second bias circuit determines the voltage of the second node to set a current driving capability of the second transistor when the cascode current source is in the inactive state, to be smaller than a current driving capability of the second transistor when the cascode current source is in the active state, the first bias circuit includes:
a third transistor which is interposed between the first current source and the second voltage line, and
a fourth transistor which is interposed between the first current source and the third voltage line,
a gate of the third transistor and the first node are connected to a node between the first current source and the fourth transistor, and
the fourth transistor receives at a gate thereof a voltage which turns on the fourth transistor.

2. The apparatus according to claim 1, wherein
the first bias circuit includes a holding capacitor which holds a voltage to be applied to a third node connected to the gate of the fourth transistor, and
the second bias circuit includes a fifth transistor which charges the holding capacitor by connecting the second node and the third node in the active state, and disconnects the second node and the third node in the inactive state.

3. The apparatus according to claim 1, wherein the second bias circuit includes
a second source follower circuit which sets the voltage of the second node in the active state, and
a circuit which sets the voltage of the second node to set the current driving capability of the second transistor in the inactive state to be smaller than the current driving capability of the second transistor in the active state.

4. The apparatus according to claim 1, wherein the second transistor operates in a saturated region in the active state.

5. The apparatus according to claim 1, wherein the first transistor and the second transistor are NMOS transistors.

6. The apparatus according to claim 1, wherein the first transistor and the second transistor are PMOS transistors.

7. A camera comprising:
a solid-state image sensor defined in claim 1; and
a processing unit which processes a signal output from the solid-state image sensor.

8. The apparatus according to claim 3, wherein the second source follower circuit includes, as a load circuit, a transistor to which the voltage of the second node in the active state is applied at a gate.

9. The apparatus according to claim 3, wherein the second source follower circuit includes a resistive element as a load circuit.

10. The apparatus according to claim 3, wherein the second source follower circuit includes a constant current source as a load circuit.

11. A solid-state image sensor including a pixel array in which a plurality of pixel units are arranged two-dimensionally, the pixel array including a plurality of column signal lines, and each pixel unit including at least one photoelectric converter and an amplifier transistor which outputs, to the column signal line, a signal corresponding to charges generated in the photoelectric converter, the solid-state image sensor comprising:
a cascode current source which supplies a current to the amplifier transistor, the cascode current source including a first transistor and second transistor which are cascode-connected;
a first bias circuit which determines a voltage of a first node connected to a gate of the first transistor;
a second bias circuit which determines a voltage of a second node connected to a gate of the second transistor; and
a first current source which is interposed between a first voltage line and a second voltage line,
wherein the amplifier transistor and the cascode current source form a source follower circuit,
the first bias circuit sets a voltage of the first node when the cascode current source is in an active state, to be equal to a voltage of the first node when the cascode current source is in an inactive state,
the second bias circuit sets the voltage of the second node to operate the second transistor in a saturated region when the cascode current source is in the active state, and turn off the second transistor or operate the second transistor in a linear region when the cascode current source is in the inactive state,
the first bias circuit includes:
a third transistor which is interposed between the first current source and the second voltage line, and
a fourth transistor which is interposed between the first current source and the third voltage line,
a gate of the third transistor and the first node are connected to a node between the first current source and the fourth transistor, and
the fourth transistor receives at a gate thereof a voltage which turns on the fourth transistor.

12. A camera comprising:
a solid-state image sensor defined in claim 11; and
a processing unit which processes a signal output from the solid-state image sensor.

13. A solid-state image sensor including a pixel array in which a plurality of pixel units are arranged two-dimensionally, the pixel array including a plurality of column signal lines, and each pixel unit including at least one photoelectric converter and an amplifier transistor which outputs, to the column signal line, a signal corresponding to charges accumulated in the photoelectric converter, the solid-state image sensor comprising:
a readout circuit which reads out a signal to be output from the pixel array to the column signal line, the readout circuit including a differential amplifier circuit including a cascode current source including a first transistor and second transistor which are cascode-connected;
a first bias circuit which determines a voltage of a first node connected to a gate of the first transistor;
a second bias circuit which determines a voltage of a second node connected to a gate of the second transistor; and
a first current source which is interposed between a first voltage line and a second voltage line,
wherein the first bias circuit determines the voltage of the first node to set a current driving capability of the first transistor in a readout state in which the readout circuit operates, to be equal to a current driving capability of the first transistor in a non-readout state in which the readout circuit does not operate,
the second bias circuit determines the voltage of the second node to set a current driving capability of the second transistor in the non-readout state to be smaller than a current driving capability of the second transistor in the readout state,
the first bias circuit includes:
a third transistor which is interposed between the first current source and the second voltage line, and
a fourth transistor which is interposed between the first current source and the third voltage line,
a gate of the third transistor and the first node are connected to a node between the first current source and the fourth transistor, and
the fourth transistor receives at a gate thereof a voltage which turns on the fourth transistor.

14. A camera comprising:
a solid-state image sensor defined in claim 13; and
a processing unit which processes a signal output from the solid-state image sensor.

15. A solid-state image sensor including a pixel array in which a plurality of pixel units are arranged two-dimensionally, the pixel array including a plurality of column signal lines, and each pixel unit including at least one photoelectric converter and an amplifier transistor which outputs, to the column signal line, a signal corresponding to charges accumulated in the photoelectric converter, the solid-state image sensor comprising:
a readout circuit which reads out a signal to be output from the pixel array to the column signal line, the readout circuit including a differential amplifier circuit including a cascode current source including a first transistor and second transistor which are cascode-connected;
a first bias circuit which determines a voltage of a first node connected to a gate of the first transistor;

a second bias circuit which determines a voltage of a second node connected to a gate of the second transistor; and a first current source which is interposed between a first voltage line and a second voltage line, wherein the first bias circuit sets a voltage of the first node in a readout state in which the readout circuit operates, to be equal to a voltage of the first transistor in a non-readout state in which the readout circuit does not operate, the second bias circuit sets the voltage of the second node to operate the second transistor in a saturated region in the readout state, and turn off the second transistor or operate the second transistor in a linear region in the non-readout state, the first bias circuit includes:
- a third transistor which is interposed between the first current source and the second voltage line, and
- a fourth transistor which is interposed between the first current source and the third voltage line,
- a gate of the third transistor and the first node are connected to a node between the first current source and the fourth transistor, and
- the fourth transistor receives at a gate thereof a voltage which turns on the fourth transistor.

16. A camera comprising:

a solid-state image sensor defined in claim 15; and a processing unit which processes a signal output from the solid-state image sensor.

* * * * *